United States Patent Office 3,522,723
Patented Aug. 4, 1970

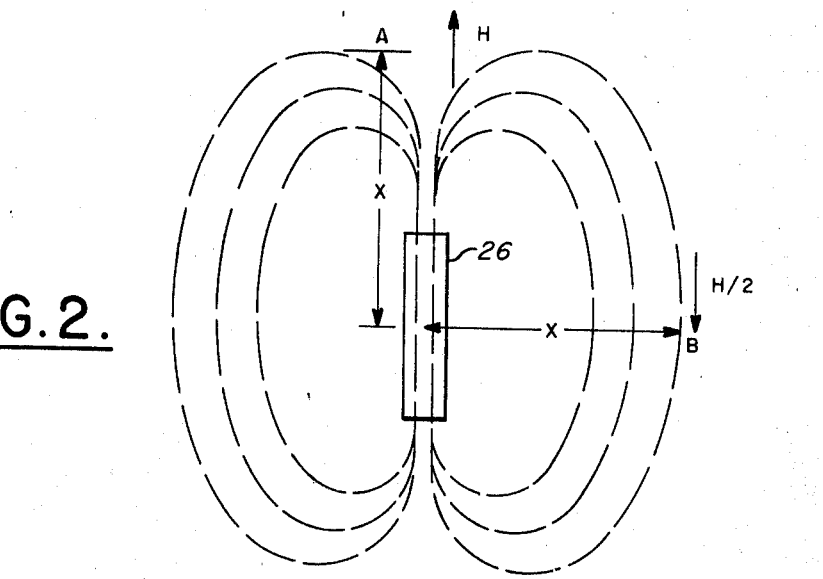
FIG.2.
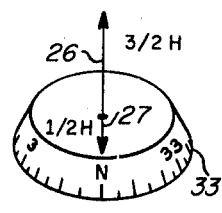 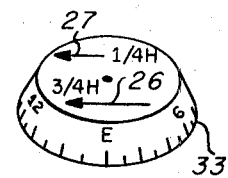
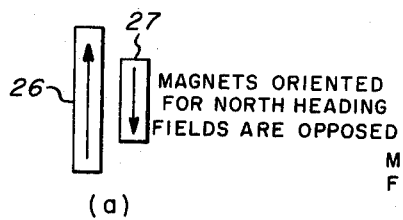 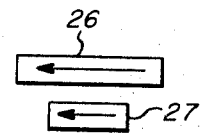
FIG.3.
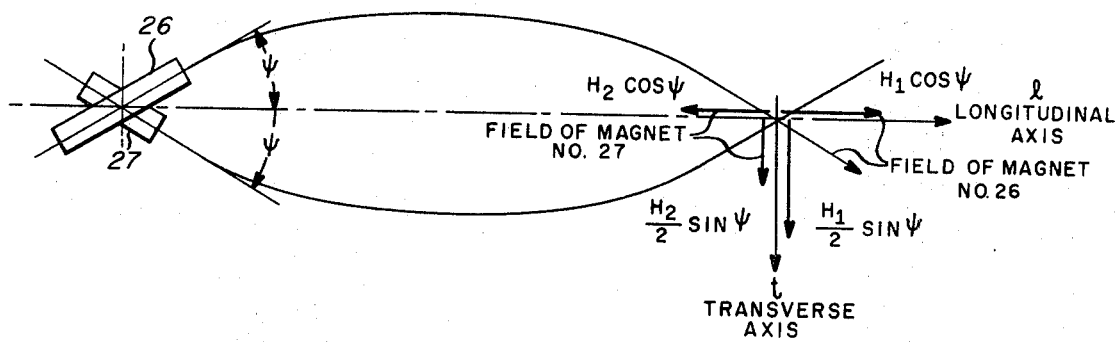
FIG.4.

3,522,723
APPARATUS AND METHOD FOR CALIBRATING MAGNETIC COMPASSES
Donald H. Baker and Donald J. Kesselring, Phoenix, Ariz., assignors to Sperry Rand Corporation, a corporation of Delaware
Filed Mar. 29, 1968, Ser. No. 717,125
Int. Cl. G01c 17/38
U.S. Cl. 73—1                                      3 Claims

ABSTRACT OF THE DISCLOSURE

Magnetic compasses are calibrated by locating permanent magnets with positionable magnetic shields near the compass to be calibrated and the horizontal component of the earth's magnetic field cancelled by the permanent magnets. The earth's magnetic field is simulated by having one permanent magnet approximately three times the magnetic field strength of another magnet and the two magnetic-field-simulating magnets mounted counter-rotatably with respect to each other. The simulated magnetic field will allow a compass swing on magnetic compasses without requiring the vehicle on which the compass is mounted to be physically rotated.

BACKGROUND OF THE INVENTION

Field of the invention

The present invention pertains to apparatus and method for calibrating magnetic compasses without physically rotating the vehicle utilizing simple, non-electrical components.

Description of the prior art

Magnetic compasses, for example of the type utilized in large aircraft for standby purposes, are responsive to a composite magnetic field. The composite magnetic field consists of the earth's magnetic field combined with the stray magnetic field contributed by the vehicle in which the magnetic compass is installed, for example, the aircraft. It will be understood that primarily the horizontal component of the earth's magnetic field is effective in magnetic compasses. With respect to the stray magnetic field, the chief undesirable component in aircraft is a single cycle component generated by portions of the aircraft that are permanently magnetized and by direct currents flowing in the aircraft wiring.

In order to have the compass provide an accurate indication through 360° it is necessary to compensate for the stray field effects at the location in the aircraft where the magnetic compass is installed. Previously, as a first step to achieve this compensation, the amount of error was measured by physically rotating the aircraft to accurately known headings from 0° to 270° in 90° increments and recording the compass reading at each heading. The compensating magnets associated with the magnetic compass were then adjusted to provide compensation in a direction to reduce the compass error. As a second step, the aircraft was then physically rotated from 0° to 345° in 15° increments in order to complete the compass calibration card to accurately compensate the compass.

It will be appreciated that the actual rotation of an aircraft or other vehicle to calibrate a compass as explained above is extremely expensive in terms of money, man-hours and aircraft down-time. Further, when the magnetic compass is used as a standby compass in conjunction with a flux valve type of compass system, due to the difference in prior art calibration procedures, the standby magnetic compass was not normally calibrated at the same time as the primary flux valve compass system thus requiring additional money, man-hours and aircraft down-time.

Prior art primary and standby compass system calibration apparatus and procedures require complex and expensive electrical equipment in an effort to eliminate the need for accurately positioning the aircraft to many separate headings on a compass rose.

SUMMARY OF THE INVENTION

The present invention provides an earth's magnetic field cancelling assembly utilized in conjunction with an earth's magnetic field simulating assembly which accurately compensates magnetic compasses and permits completion of the compass calibration card without requiring the physical rotation of the vehicle on which the magnetic compass is installed. The apparatus of the present invention is compact, portable, extremely simple in both structure and operation and requires no electrical equipment. Furthermore, in an aircraft, for example, the standby compass may be calibrated simultaneously with the calibration of the primary flux valve compass system thus achieving an extensive reduction in money, man-hours and aircraft down-time.

BRIEF DESCRIPTION OF THE DRAWINGS

FIG. 2 is a plan view of a typical permanent magnet showing its magnetic field;

FIGS. 3a and 3b show a pair of permanent magnets oriented for North and East headings respectively; and FIG. 4 is a schematic plan view of a pair of magnets showing the interrelationship of their magnetic fields.

DESCRIPTION OF THE PREFERRED EMBODIMENT

Figure 1:
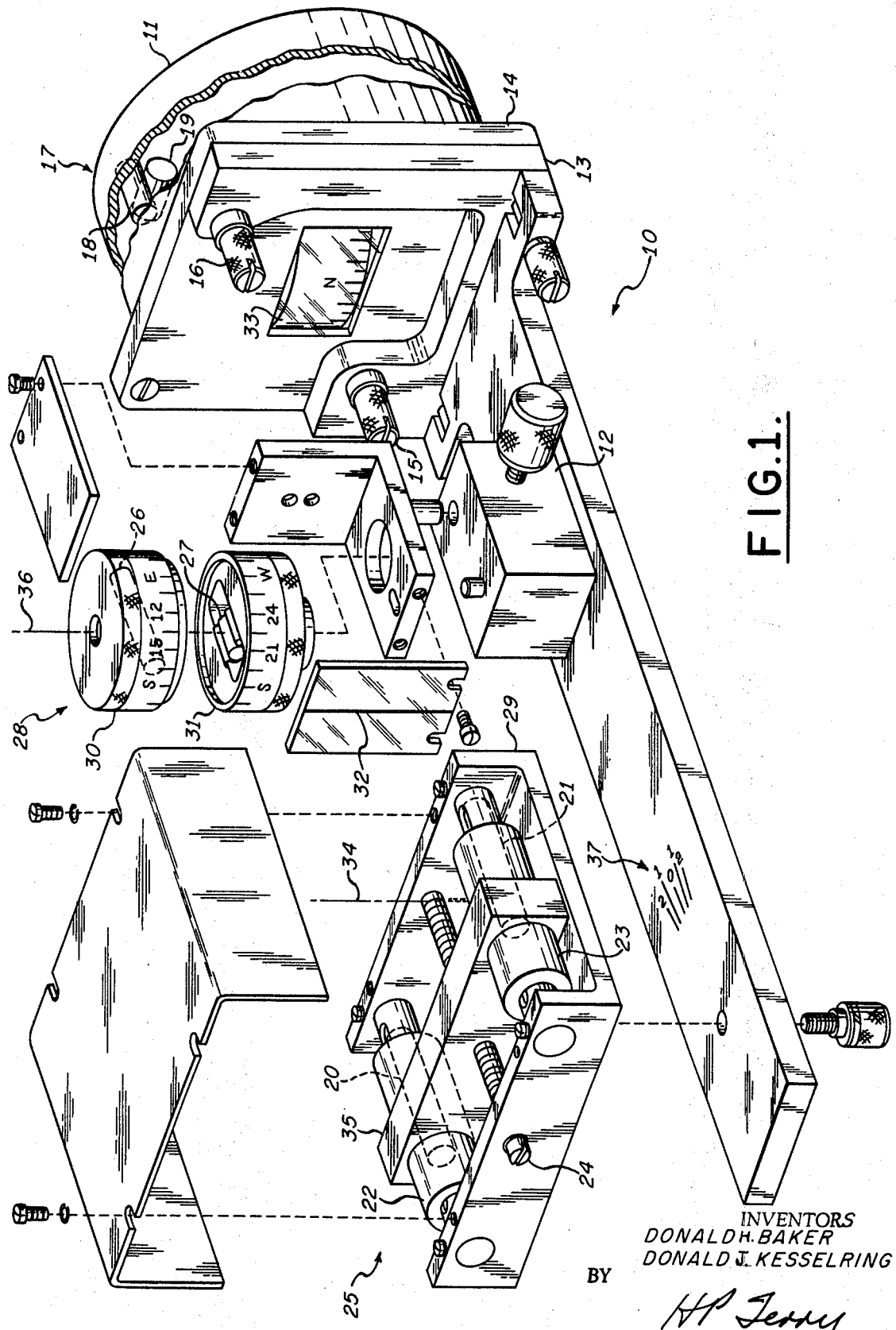
FIG. 1 is a perspective view of a compass calibrator connected to an aircraft magnetic compass.

Referring now to FIG. 1 of the drawings, the compass calibrator 10 of the present invention is shown secured to a conventional standby magnetic compass 11 of the type which may be utilized in an aircraft for example. The standby compass calibrator 10 includes a mounting base 12 secured to a mounting bracket 13 which in turn is mounted on the front plate 14 of the compass 11 by means of two mounting screws 15 and 16, for example, while the compass 11 is mounted in its normal position on the aircraft instrument panel. The compass 11 includes a conventional compass compensator 17 in the form of a pair of small permanent magnets 18 and 19 and may be of the type shown in U.S. Pat. No. 2,887,872. The magnets 18 and 19 are rotatable to compensate for the aforementioned single cycle error caused by stray magnetic fields.

The compass calibrator 10 performs two separate functions. One is to cancel the earth's magnetic field at the location of the compass 11 and the other is to simulate the horizontal component of the earth's magnetic field to provide a standard magnetic field which can be rotated to simulate aircraft headings to permit the single cycle compass error to be determined and a compass card to be calibrated.

The compass calibrator 10 includes a pair of permanent magnets in the form of spaced, parallel rods 20 and 21 that are horizontally disposed for cancelling the horizontal component of the earth's magnetic field in the vicinity of the compass 11. The magnets 20 and 21 are fixedly mounted on a plate 29 that in turn is pivotally mounted for limited freedom (for example ±2°) about a vertical axis 34 on the base 12. The ±2° pivotal mounting of the plate 29 is to compensate for any angular misalignment between the magnetic North and the actual heading of the aircraft and is measured with respect to graduations 37. A pair of hollow cylindrical soft iron shields 22 and 23 are cooperative with the magnets 20 and 21, respectively, such that by means of an adjusting screw 24 through a support member 35, the shields 22 and 23 are movable to enclose or expose more or less of their respective magnets 20 and 21 to permit the cancelling magnetic field strength to be adjusted. The magnets 20 and 21, shields 22 and 23, adjusting screw 24, plate 29 and support member 35 comprise a field cancelling assembly 25. The magnets 20 and 21 are arranged to slide within the respective openings in the shields 22 and 23 in order that moving the shields 22 and 23 to enclose more of the magnets 20 and 21 shorts an increasing number of magnetic flux lines thereby reducing the effective magnetic field strength. A wide range of magnetic field strengths may be obtained in this manner to permit cancellation of the earth's horizontal magnetic field at any location on the surface of the earth.

The simulated magnetic field is produced by a pair of horizontal bar magnets 26 and 27 disposed in a field simulating assembly 28. The bar magnet 26 is disposed in a hollow cylindrical rotatable housing 30 while the bar magnet 27 is disposed in a similar hollow cylindrical housing 31 both of which are rotatable about a vertical axis 36 with respect to each other on the base 12. Each of the housings 30 and 31 have graduations thereon to define their relative positions. A lubber line 32 is fixedly disposed on the base 12 for cooperation with the graduations on the housings 30 and 31 as well as those on the compass card 33 of the compass 11.

The resultant magnetic field produced by the bar magnets 26 and 27 of the field simulating assembly 28 is rotatable through 360° to simulate the desired compass heading in a manner to be explained. A standard magnetic field of approximately 0.18 oersteds, for example, is provided by factory adjustment of the magnet strength.

Referring now to FIG. 2, the magnetic field strength of a typical bar magnet such as 26 of the field simulating assembly 28 is illustrated with each dotted line emanating from the ends of the bar magnet 26 representing a magnetic flux line. At a given distance X from the center of the bar magnet, the field strength varies depending upon the direction with respect to alignment through the center of the magnetic poles. If the point A, near the pole end of the magnet, has a magnetic field strength H, the equivalent point B at the side of the magnet will have a field strength of one-half that amount $H/2$ as illustrated.

To produce a uniform simulated magnetic field throughout 360°, the arrangement shown in FIGS. 3a and 3b is used. The two magnets 26 and 27 are employed to provide a standard simulated magnetic field at any simulated heading by making the intensity of the magnet 26 approximately three times the intensity of the magnet 27. Then, for a North heading as shown in FIG. 3a, the magnets 26 and 27 are opposed thereby providing a field strength proportional to their difference and equal to the standard magnetic field H. The simulated magnetic field is rotated to a new heading when the two magnets 26 and 27 are rotated with respect to one another and with respect to the compass 11. As shown in FIG. 3b, at an East heading, the field strength of each of the magnets 26 and 27 is only one-half of the previous strength for a North heading because of the effect explained above with respect to FIG. 2. The magnets 26 and 27 are aligned for a simulated East heading so that their magnetic fields add to produce a total simulated magnetic field strength equal to the standard field H.

The principle of producing a uniform simulated magnetic field throughout 360° may be explained mathematically by referring to FIG. 4. The two magnets 26 and 27 produce fields as shown in FIG. 4 which effectively produce longitudinal and transverse components equal to:

$$Hl = H_1 \cos \psi - H_2 \cos \psi = (H_1 - H_2) \cos \psi$$

$$Ht = \frac{H_1}{2} \sin \psi + \frac{H_2}{2} \sin \psi = \frac{(H_1 + H_2)}{2} \sin \psi$$

To simulate a field of 0.18 oersted at a heading, $\psi$, $Hl$ and $Ht$ must be:

$$Hl = 0.18 \cos \psi$$
$$Ht = 0.18 \sin \psi$$

Combining these equations yields:

$$(H_1 - H_2) \cos \psi = 0.18 \cos \psi$$

$$\frac{(H_1 + H_2)}{2} \sin \psi = 0.18 \sin \psi$$

or $$H_1 - H_2 = 0.18$$
$$H_1 + H_2 = 0.36$$

which yields the following solutions for $H_1$ and $H_2$:

$$H_1 = 0.27 \text{ oersted}$$
$$H_2 = 0.09 \text{ oersted}$$

Thus, if a three to one ratio is established the desired field will be generated.

In operation, on a vehicle utilizing a standby magnetic compass as well as a primary compass system, the calibration of the standby compass in accordance with the present invention is normally performed simultaneously with the calibration of the primary compass system. Assuming an aircraft, for example, it may be placed in any area free of magnetic interference and a compass rose is not necessary.

Normally, utilizing the compass calibrator 10 of the present invention requires two separate operations. First, is the cancellation of the earth's magnetic field which is usually performed periodically for example, at approximately two month intervals. The second is the calibration of the aircraft magnetic compass 11 which is performed with the aircraft located in the same area without requiring readjustment of the field cancelling assembly 25.

The cancellation of the earth's magnetic field by adjustment of the field cancelling assembly 25 calibrates the compass calibrator 10 for subsequent use in compass swinging as explained above. This calibration is performed in the following manner utilizing the steps indicated below:

(1) A non-magnetic stand (not shown) is established adjacent to the magnetic compass swing site preferably within approximately 20 feet of the position which the magnetic compass will assume in the aircraft when the aircraft is positioned along a surveyed North/South line. This is to insure that the earth's magnetic field at the aircraft magnetic compass and at the turntable site are substantially identical.

(2) Remove the compensating magnets 18 and 19 from a spare magnetic compass 11. Remove the mounting bracket 13 from the compass calibrator 10 and attach it to the magnetic compass 11. Place the magnetic compass 11 and the attached bracket 13 on the turntable.

(3) Rotate the magnetic compass 11 until it indicates a North heading as viewed on the compass card 33.

(4) Attach the compass calibrator 10 to the mounting bracket 13 without moving the magnetic compass 11. Set the field cancelling assembly misalignment adjustment to 0° with respect to the graduations 37.

(5) Adjust the field simulating magnet assembly 28 to the East position. Adjust the field cancelling assembly 25 by means of the adjusting screw 24 until the magnetic compass 11 indicates East or 90°.

(6) Adjust the field simulating magnet position 28 to the West position. Adjust the field cancelling assembly 25 to remove one-half the error between the indicated compass reading and West or 270°.

(7) Adjust the field simulating magnet assembly 28 alternately to East and West taking readings of the magnetic compass 11 at each heading. Adjust the field cancelling assembly 25 for the best compromise (no cyclic error) between the East and West headings.

The compass calibrator 10 is now calibrated and the field cancelling assembly 25 will now exactly cancel the earth's magnetic field at the swing location. It should not be necessary to repeat this calibration except for periodic checks every few months.

The following steps may now be used to perform a compass swing of the magnetic compass 11 using the calibrated compass calibrator 10:

(1) Place the aircraft into position on the surveyed North/South line with the aircraft heading approximately North.

(2) Determine the angular difference between the aircraft heading and the North/South line.

(3) Rotate the field cancelling assembly 25 which has a range of pivotal movement of ±2° with respect to the base 12 to compensate for the measured angular misalignment.

(4) Attach the compass calibrator 10 to the magnetic compass 11 as it is mounted in the instrument area of the aircraft by means of the mounting screws 15 and 16. The compass calibrator 10 may be mounted upright as shown in FIG. 1 or may be inverted in order that the magnetic compass compensation adjustments are accessible.

(5) The field simulating assembly 28 is rotated to simulate the four cardinal headings and the magnetic compass compensator magnets 18 and 19 are adjusted in the usual manner.

(6) The field simulating assembly 28 is then positioned to simulate each 15° increment from 0° through 345°. At each 15° increment, the compass reading is noted on the compass card 33 and the compass calibration card is completed whereby the magnetic compass compensator magnets 18 and 19 may be finally adjusted.

From the above explanation, it will be appreciated that the compass calibrator 10 of the present invention by using accurately calibrated methods in the manner explained above eliminates the necessity for electrical power connections necessary in prior art compass calibration apparatus. Further, the compass calibrator 10 of the present invention may be conveniently operated at the compass swinging site and within the aircraft at the magnetic compass location without the necessity of physically rotating the aircraft. In addition, the magnetic compass 11 when used as a standby compass may be calibrated simultaneously with the calibration of the primary flux valve type of magnetic compass system thereby minimizing the number of man-hours and aircraft down-time required to calibrate both systems.

While the invention has been described in its preferred embodiment, it is to be understood that the words which have been used are words of description rather than limitation and that changes may be made without departing from the true scope and spirit of the invention in its broader aspects.

We claim:

1. Apparatus for calibrating a magnetic compass comprising
    first adjustable permanent magnet means for generating a magnetic field equal and opposite to the horizontal component of the earth's magnetic field at a particular location for effectively cancelling said horizontal component of the earth's magnetic field in the vicinity of said magnetic compass,
    second adjustable permanent magnet means for simulating a standard magnetic field throughout 360° in the vicinity of said magnetic compass wherein said second adjustable permanent magnet means includes first and second permanent magnets rotatable with respect to each other with said first magnet having approximately three times the magnetic field strength of said second magnet, said first and second magnets being relatively positioned to provide the same magnitude of said simulated standard magnetic field through 360°, and
    indexing means cooperative with said second adjustable permanent magnet means for accurately positioning the standard magnetic field vector throughout 360° whereby a compass calibration card may be defined.

2. Apparatus of the character recited in claim 1 in which said first adjustable permanent magnet means is rotatable to compensate for angular misalignment between the surveyed magnetic North and the actual heading of said magnetic compass.

3. Apparatus of the character recited in claim 1 in which said first adjustable permanent magnet means includes a pair of spaced magnets and cooperative positionable shielding means for varying their magnetic field strength in accordance with said particular location.

References Cited

UNITED STATES PATENTS

| | | | |
|---|---|---|---|
| 1,933,194 | 10/1933 | Urfer | 33—225 |
| 3,418,840 | 12/1968 | Wallace. | |

FOREIGN PATENTS

| | | |
|---|---|---|
| 598,751 | 2/1948 | Great Britain. |
| 934,900 | 1/1948 | France. |

LOUIS R. PRINCE, Primary Examiner

H. C. POST III, Assistant Examiner